United States Patent [19]

Frantello et al.

[11] 4,295,324
[45] Oct. 20, 1981

[54] BALANCED MOWER HEAD FOR CARRYING A PLURALITY OF MONOFILAMENT LINES

[75] Inventors: Alfred A. Frantello, Satellite Beach, Fla.; Lester R. Kefauver, Knoxville, Tenn.

[73] Assignee: Corinco, Inc., Knoxville, Tenn.

[21] Appl. No.: 164,093

[22] Filed: Jun. 30, 1980

[51] Int. Cl.$^3$ ............................................. A01D 55/18
[52] U.S. Cl. ........................................ 56/12.7; 56/295; 30/276; 30/347
[58] Field of Search .................. 56/12.7, 295; 30/276, 30/347

[56] References Cited

U.S. PATENT DOCUMENTS

| | | | |
|---|---|---|---|
| 3,826,068 | 7/1974 | Ballas et al. | 56/295 |
| 4,104,797 | 8/1978 | Ballas | 56/12.7 |
| 4,176,508 | 12/1979 | Baumann et al. | 30/276 |
| 4,250,621 | 2/1981 | Houle | 56/295 |

FOREIGN PATENT DOCUMENTS 237877 8/1958 Australia ............................... 56/295

2382840 11/1978 France ................................ 30/276

*Primary Examiner*—Robert A. Hafer
*Attorney, Agent, or Firm*—Pitts & Kesterson

[57] ABSTRACT

A balanced mower head for carrying a plurality of monofilament lines. The mower head is suitable for being mounted on the shaft of conventional rotary mower and includes certain features which particularly adapt the head for universal fit and for replacing the conventional mower blade with monofilament cutting lines thereby substantially enhancing the safety of the cutting operation. The head defines a bore extending therethrough which is proportioned for receiving the shaft which normally carries the blade of a conventional rotary mower. A plurality of line holders extend outwardly from the head body and define at their outboard end portions an opening which is proportioned for receiving a line such that the line extends outwardly from the outboard end portion of each of the line holders to perform the cutting operation upon rapid rotation of the head. Means are provided for generating air currents in a vertical direction during the cutting operation to stand the vegetation up prior to its being cut.

10 Claims, 8 Drawing Figures

BALANCED MOWER HEAD FOR CARRYING A PLURALITY OF MONOFILAMENT LINES

BACKGROUND OF THE INVENTION

This invention relates to a rotary mower head adapted for carrying a plurality of monofilament line cutters, and more particularly concerns a monofilament line cutter having certain universal fit features which adapt the head for replacing conventional cutting blades.

Conventional rotary mowers carry an elongated blade which is centrally mounted on a shaft rotatably driven by an engine during the cutting operation. To assist in preventing rotation of the blade with respect to the shaft, certain conventional rotary mowers incorporate a hub having keys positioned at preselected locations which engage openings within the blade on either side of the bore through which the mounting shaft extends. The spacing of the keys from each other and from the central portion of the shaft varys depending on the particular manufacturer of the mower.

Certain problems concommitant with the operation of rotary mowers are well known in the art. For example, if an operator comes into contact with the rotating blade during the cutting operations, serious injury is likely to be incurred. Such injuries are normally occasioned during the starting operation or while mowing, as when an operator or bystander inadvertantly moves a portion of his body, such as his foot, under the mower housing and into contact with the rotating blade. Moreover, rotary mowers tend to throw projectiles such as rocks, sticks, or other items at rest in the vegetation to be cut, from the discharge section of the mower housing. These projectiles often travel at a high velocity and may strike a bystander, or the operator, causing severe injury such as the loss of an eye.

In order to maintain a rotary mower in satisfactory operating condition, it is necessary that the end portions of the cutting blade be periodically sharpened. To this end, an operator must be removed the blade from the mounting shaft, and hone the end portions of the blade to a cutting edge as with a file. After a period of time, and sucessive sharpenings, the blade can become unbalanced due to the unequal removal of stock from one end portion thereof. An unbalanced blade may cause substantial vibration in the mower and/or unnoticed and accelerated deterioration of the engine.

Accordingly, it is an object of the present invention to provide an improved mower head which can be mounted on conventional rotary cutting mowers to replace the existing blade.

Another object of the invention is to provide a rotary cutting blade replacement which can be readily installed and which can be safely operated.

A further object of the invention is to provide a mower head incorporating monofilament lines which can be readily and inexpensively replaced.

Still another object of the invention is to provide a mower head which generates air currents in a vertical direction to stand the vegetation up during the cutting operation to assist in assuring an even cut.

Yet, another object of the invention is to provide a system for mounting the monofilament lines which reduces the stress forces applied to the line during the cutting operation thereby increasing the useful life of the lines.

Further objects and advantages of the invention will become apparent upon reading the detailed description together with the drawings in which.

SUMMARY OF THE INVENTION

In accordance with various features of the invention, a rotary cutting head is provided for carrying a plurality of monofilament lines. The cutting head is designed for substantially universal replacement of the existing rotary mower blades to enhance the safety of the cutting operation and to reduce maintance. The head body defines a substantially centrally positioned bore which is proportioned for receiving the shaft which secures the blade of a conventional rotary mower. A plurality of line holders extend outwardly from the body, and each line holder defines an outboard end portion having an opening therethrough for receiving a monofilament cutting line. A grass lifting blade is carried by each arm, and generates air currents in a vertical direction during operation of the mower to stand the vegetation up during the cutting operation. In one embodiment of the invention, the opening in each of the line holders is proportioned for receiving a sleeve which reinforces the inboard end portion of the line which extends therethrough. This reinforcing sleeve assists in preventing the shearing forces applied to the line during cutting operations from breaking or shearing the line.

DESCRIPTION OF THE PREFERRED EMBODIMENT

Figure 1:
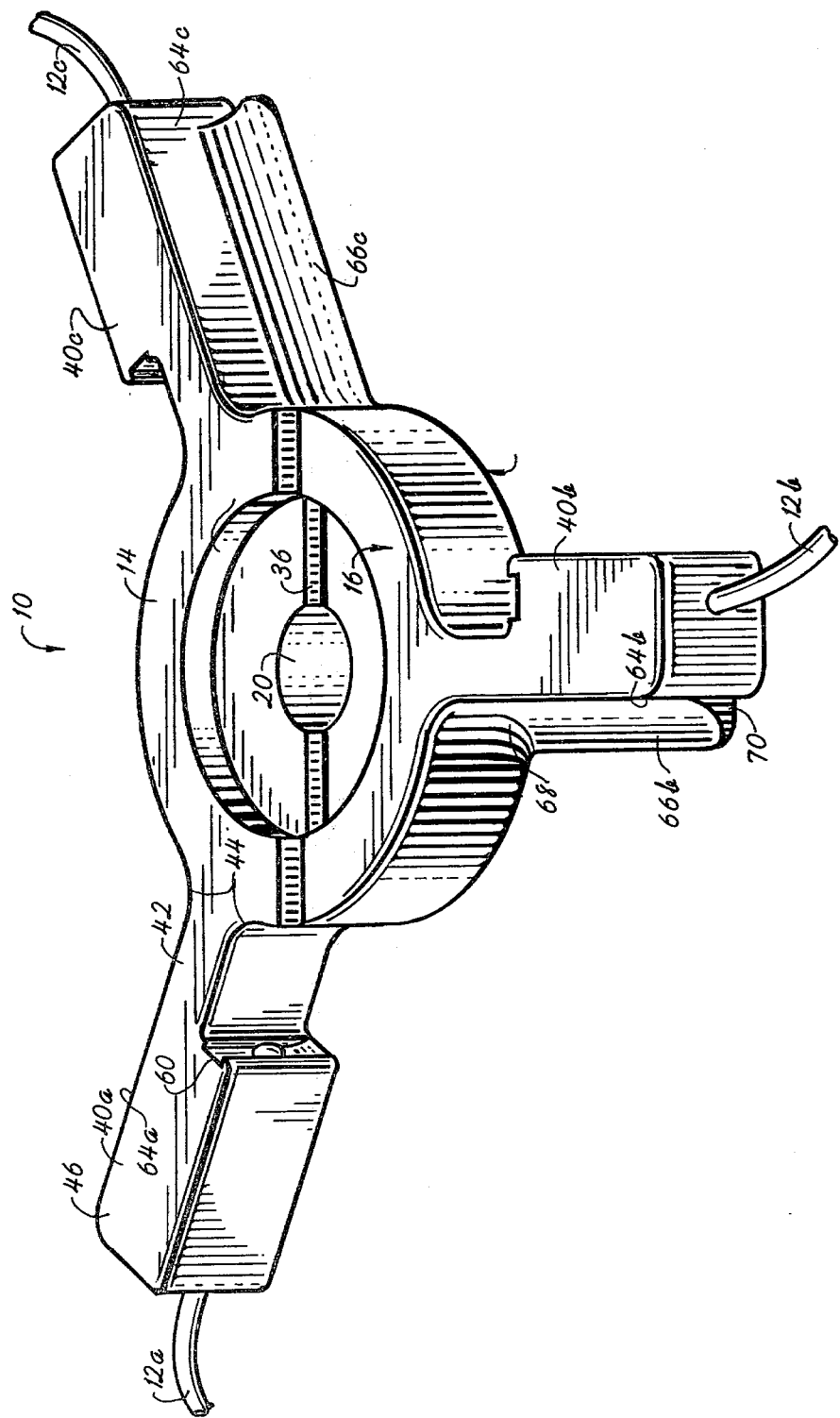
FIG. 1 is a perspective view of a mower head incorporating various features of the invention.

Referring now to the drawings, a mower head constructed in accordance with various features of the invention is illustrated generally at 10 in FIG. 1. The illustrated mower head is designed for replacing a conventional rotary cutting blade on state of the art of rotary lawn mowers. The illustrated mower head carries a plurality of monofilament lines 12a, b and c which are rotated at a speed substantially equivalent to the speed at which a conventional rotary cutting blade is rotated. These monofilament lines cut the grass yet, they are designed such that if a portion of the users body comes in contact with the monofilament lines, little, if any, injury is likely to occur.

Figure 4:
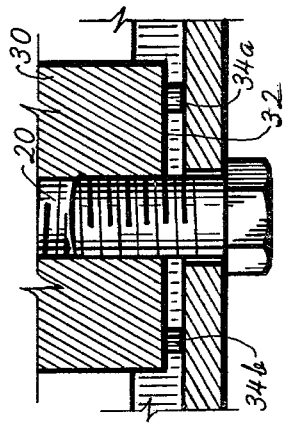
FIG. 4 illustrates a sample mounting of the invention on a conventional mower head having a shaft and a mounting hub carrying keys which fit within the keyway or openings provided in the mower head body.
Figure 4A:
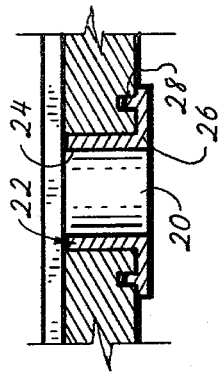
FIG. 4A illustrates a sectional side elevation view of an adaptor for adjusting the effective diameter of the central head bore.
Figure 2:
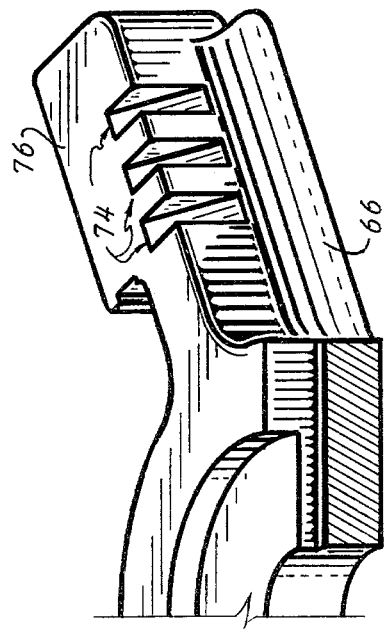
FIG. 2 is a perspective view of one of the line holders with a portion of the mower head body broken away for illustrative purposes.
Figure 3:
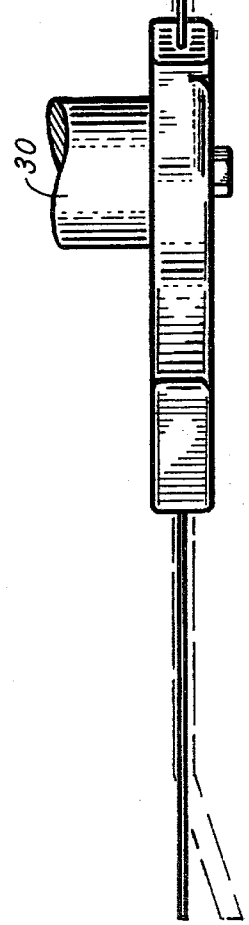
FIG. 3 is an elevation view illustrating a feature of the invention whereby the monofilament lines reside within the cutting plane of the conventional mower blade which is replaced by the mower head of the present invention.

The mower head illustrated in FIG. 1 includes a head body 14 which is substantially circular in outline and defines an upper surface 16 and a lower surface 18. A bore 20 extends through the head body at a substantially central location and opens at its lower end portion on the lower surface 18 and at its upper end portion on the upper surface 16. This bore is proportioned for receiving the shaft which secures a conventional rotary cutting blade to its drive train. In one embodiment of the invention, means are provided for varying the effective diameter of the bore 20. To this end, an adapter 22 as illustrated in FIG. 4A is provided. This adaptor is substantially cylindrical in outline and includes an outside diameter which fits snuggly within the bore 20 and defines an internal diameter 24 which is proportioned for receiving the shaft 20. The lower end portion of the adaptor defines a flared section 26 which includes keys 28 which are inserted within suitable recesses provided on the lower surface 18 of the body head to prevent rotation of the hub with respect to the head body.

The upper surface 16 of the head body is provided with an outline suitable for mounting the head on a conventional rotary mower. In the embodiment illustrated in FIG. 1, the upper surface 16 is provided with a milled-out section indicated generally at 28. This milled-out section 28 is provided with an internal diameter proportioned for receiving a mounting hub 30 indicated in FIG. 4 which serves to provide an interface between the drive train of rotary mower and a blade secured to the mounting hub by the shaft 20. This mounting hub 30 includes at its lower surface 32 a plurality of keys 34 which are received within suitable recesses or bores defined in the blade such that upon mounting the blade on the hub, the mating between the keys 34 and the bores in the blade, prevents rotation of the blade with respect to the mounting hub.

In the preferred embodiment of the invention, a keyway 36 is provided which opens on the upper surface 16 of the head body. This keyway is proportioned for receiving keys such as the keys 34 upon mounting the mower head on the hub 30. Inasmuch as the spacing between the keys 34 and the spacing between each key and central shaft may vary depending upon a particular mower manufacturer, this keyway 36 is designed for receiving the keys 34 regardless of a particular key spacing. This feature, as it will be recognized by those skilled in the art, enhances the universal fit and mounting aspects of the mower head. In a further embodiment illustrated in FIG. 6, the keyway 36 is replaced by bores 38 a & b opening onto the upper surface 16 of the mower head body, or more particularly, on the surface of the milled-out section 28. These bores may be spaced at preselected locations for mounting the mower head on a particular rotary mower hub having predetermined key spacings. Alternatively, a plurality of bores may be provided on either side of the central bore 20 such that the head 10' can be mounted on a plurality of mower hubs having different key spacing.

Means are provided for holding the supporting the monofilament lines 12 at preselected locations for performing the cutting operation upon rotation of the head. In the embodiments illustrated, the line holding means comprises a plurality of annularly spaced line holders 40. While three line holders are spaced approximately 120° as illustrated in the preferred embodiment, the number of line holders can vary. For example, there could be two or five line holders. Each of the line holders is substantially indentical, and a description of one line holder will serve as a description of each line holder. Each of the line holders includes a first end portion 42 which is joined with the head body at preselected annularly spaced locations such that the mower head weight is evenly distributed and balanced. In the embodiment illustrated, the junction between the first end portion of the line holder and the head body is radiused at the location 44 to reinforce the line holder support and assist in preventing the line holder from being severed from the head body during mowing operations as when a line holder strikes an object below the mower housing.

Each of the line holders 40 includes an outboard end portion 46 which defines an opening 48 proportioned for receiving a monofilament line therethrough. The longitudinal axis of the opening 48 is substantially perpendicular to the axis of the bore 20 in the head body.

Figure 5:
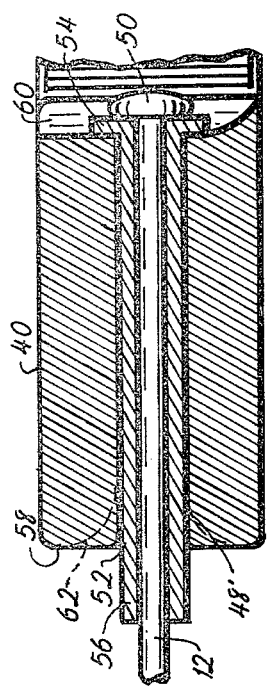
FIG. 5 illustrates a reinforcing sleeve mounted in a line holder.

As illustrated in the Figures, the outboard end portion 46 of each of the line holders is of an increased cross-sectional outline and defines an outermost surface 58 and an innermost surface 57. The opening 48 extends between the outermost surface and the innermost surface and is proportioned for receiving, in one embodiment the monofilament line in a snug fit, and in another embodiment the monofilament line mounted in the reinforcing sleeve. As shown in FIG. 5, the the end portion 62 of the bore 48 can be radiused to eliminate the shear point at the intersection of the surface 58 and the line/sleeve.

Figure 6A:
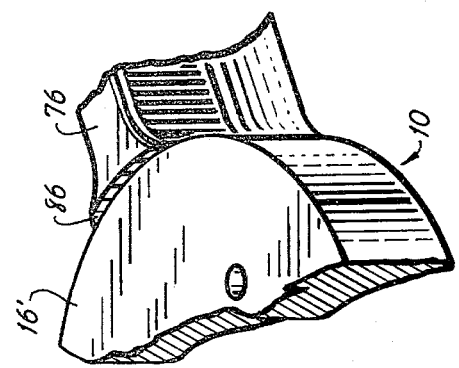
FIG. 6A is a perspective view of a portion of the mower head body and a line holder arm illustrating an alternate formation or embodiment of the body and arm upper surface.
Figure 6:
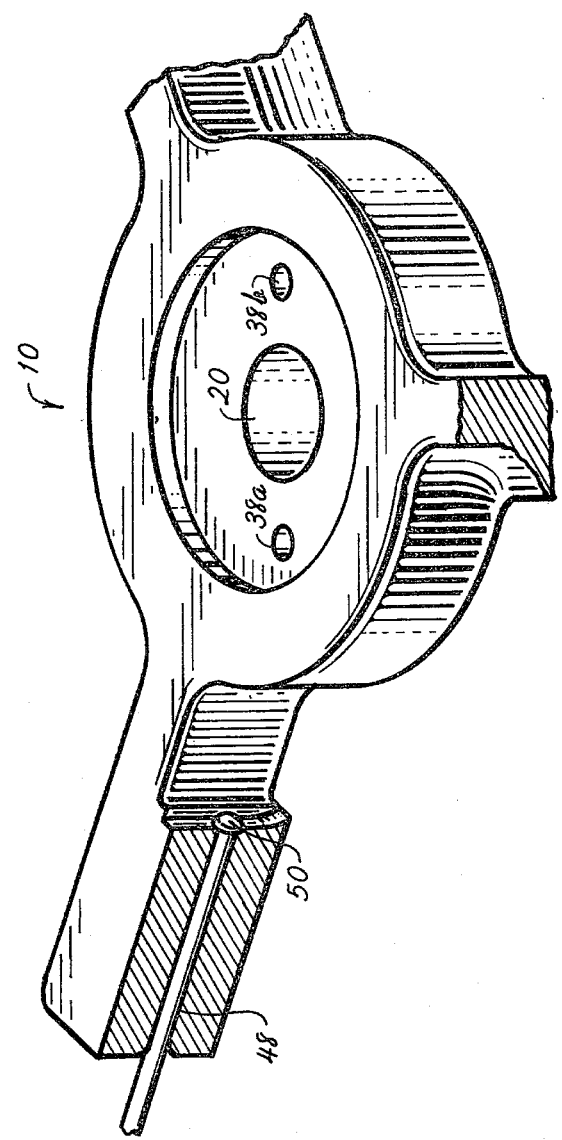
FIG. 6 is a sectional view of one of the line holders broken away from the mower head body with the line holder opening carrying a monofilament line disposed in a reinforcing sleeve.

In the embodiment illustrated in FIGS. 1 and 6, the opening 48 is proportioned for snuggly receiving a monofilament line therethrough. As illustrated in FIG. 6, this monofilament line is drawn through the bore 48 until a flared or increased diameter end portion 50 of the line rests against the mouth or surface proximate the bore such that movement of the line through the bore is prevented during operation of the mower. In the embodiment shown in FIG. 5, the bore 48' is proportioned for receiving a monofilament line therethrough which is mounted in a reinforcing sleeve 52. This reinforcing sleeve defines a longitudinal bore which snuggly receives a monofilament line therein. The reinforcing sleeve includes a flared section 54 at one end portion which engages the surface 57 which is proximate the mouth of the bore 48' such that the sleeve and line contained therein will not move in a radial direction through the bore. The outside diameter of the sleeve 52 is snuggly received in the bore 48' such that this sleeve and the line contained therein will not rotate with respect to the bore 48' during the operation of the mower.

The length of the sleeve is proportioned for extending at its outboard end portion 56 a preselected distance outwardly from the outermost surface 58 of the line holder 40. The length of the outboard end portion 56 of the reinforcing sleeve extending beyond the outermost surface 58 is controlled such that shearing forces are spread along the length of this reinforcing sleeve to assist in preventing shearing or severing of the monofilament line 12 during the cutting operation. In this connection, the reinforcing sleeve is manufactured from a flexible yet semirigid material which will bend during the cutting operation to distribute the shearing forces along a preselected length of the monofilament line proximate the outboard end portion of the reinforcing sleeve.

It has been found that a sleeve to line ratio of approximately 3.75 to 11.00, where the line is eleven inches long provides satisfactory attenuation of the shear forces and enhances the useful life of the line, particularly where the flexible sleeve extends approximately 1 inch beyond the end portion of the line holder.

In the embodiments illustrated, the innermost surface 57 and the outboard end portion of the line holder defines an elongated grove 60 which receives the flared head of the monofilament line therein and, when the line is mounted in the reinforcing sleeve, the flared portion of the sleeve. (See FIGS. 1 and 5)

Each of the line holders extend radially outwardly from the head body and define an opening through the outboard end portion. Each of the openings has a longitudinal axis which is substantially parallel with, and offset from the longitudinal respective line holder.

Each of the line holders defines a leading surface 64 which is disposed on the portion of the line holder which first contacts vegetation to be cut upon rotation of the mower head. For example, the leading surface for a clockwise rotating mower head, is on the upstream side of the line holder with respect to its clockwise rotation during its line cutting operation.

An important feature of the invention is the provision of means for generating air currents in a vertical direction during operation of the mower to stand the vegetation up, during the cutting operation of the mower. To this end, a grass lifting blade 66 is provided on the leading surface of each of the line holders. More specifically, each of the grass lifting blades in the illustrated embodiments is integrally formed with the line holder and the head body. At the juncture of the line holder and the head body, illustrated at 68 in FIG. 1, the integral formation of the blade and the head body serve to provide additional reinforcement for the line holder. The illustrated blade includes a curved surface which upon rapid rotation during the cutting operation, generates vertical air currents below the mower housing which assists in standing the grass up during the cutting operation to assure an even cut. The illustrated blade terminates at a spaced location from the end surface 58 of the line holder and defines a lower surface 70 which is coplanar with the lower surface of the line holder in the illustrated embodiment.

In the preferred embodiment of the invention, means are provided to enhance the mulching effect of the mower head. To this end, mulching means or grooves 74 having a substantially triangular outline are provided on the line holder and open onto the leading surface 64 and the upper surface 76 of each of the line holders. These grooves, during rapid rotation of the mower head, contact and mulch grass, particularly the cut grass entrained in air currents within the mower housing.

Conventional lawn mowers are generally provided with means for adjusting the spacing of the cutting plane with respect to the ground, such that the height of the cut grass can be predetermined. For example, in certain lawn mowers the shafts mounting the wheels can be positioned in preselected bores or openings in the housing which are spaced vertically to adjust the height of the cut. An important feature of the present invention is to provide a mower head which positions the monofilament lines in substantial alignment with the cutting plane of a conventional mower such that a mower having had its blade replaced by the mower head of the present invention, can be adjusted for controlling the cut height in a manner substantially identical to the adjustment of the mower prior to replacing the blade. In this connection, the head body is fabricated of a preselected thickness and the openings in the line holders lie within a plane such that the monofilament lines during cutting operation, lie within the cutting plane, illustrated diagrammatically at 80 in FIG. 5 by an arrow, of the conventional mower.

In the embodiment illustrated in FIG. 6A, an alternate upper surface 16' of the head body is depicted. In this alternate embodiment, the head body surface 16' and the upper surface of the line holder 76 define a shoulder 86 at the juncture of these two members.

From the foregoing detailed description, it will be recognized, by those skilled in the art, that a mower head incorporating various improvements over the state of the art has been illustrated and described. For example, the illustrated mower head can be universaly mounted on conventional rotary blade mowers. Utilization of the illustrated mower head together with the monofilament lines carried thereby, enhance the safety with which grass and other vegetation can be cut. The mower head can be readily installed on the conventional mower and is balanced to reduce and/or prevent excessive wear on the rotary mower motor. The distribution of the mower head weight is designed to provide sufficient torque in the area of the line holders to start an internal combustion engine. Further, the mower head and the monofilament lines are easily maintained and the lines can be readily replaced subsequent to their length being diminished after continued use. Since, the single line strands have an extended useful life and can be readily replaced, the need for an automatic feed is eliminated. A reinforcement sleeve is provided in one embodiment of the invention which assists in distributing the shear forces normally occassioned on the monofilament line proximate the contact surface 58 of the line holder. This reinforcing sleeve enhancing the useful life of the monofilament line, and can be sold with replacement lines as an integral unit.

While a preferred embodiment has been shown and described, it will be understood that there is no intent to limit the invention by such disclosure, but rather, it is intended to cover all modifications and alternate constructions falling within the spirit and scope of the invention as defined the appended claims.

What is claimed is:

1. A head for carrying a plurality of monofilament lines suitable for being mounted on the shaft which secures the blade of a conventional rotary mower said head comprising:

a head body defining an upper surface and a lower surface, and a centrally positioned bore extending through said head body, one end portion of said bore opening on said upper surface and the further end portion of said bore opening on said lower surface, said bore being proportioned for receiving said shaft, a plurality of line holders extending outwardly from said body, each of said line holders including a first end portion joined with said body at annularly spaced locations, and an outboard end portion, said outboard end portion defining an opening therethrough having an axis substantially perpendicular to the axis of said bore in said body, each of said line holders defining a leading surface, and a grass lifting blade carried by the leading surface of each line holder, said blade serving to generate air currents in a vertical direction during operation of said mower to stand the vegetation up during the cutting operation.

2. The head as defined in claim 1 wherein each of said line holders extends radially outwardly from said head body.

3. The head of claim 1 wherein the outboard end portion of each of said line holders is of increased cross-sectional outline and defines an outermost surface and an innermost surface, the opening in said outboard end portion extending between said outermost surface and said innermost surface and proportioned for receiving and holding portion of a monofilament line therein.

4. The head of claim 3 wherein each of said openings in said outer most end portion of said line holders defines and axis substantially parallel with the longitudinally and radially extending axis of its respective line holders.

5. The head of claims 1, 2 or 4 wherein each of said line holders defines a plurality of groves proximate their respective leading surfaces whereby said grooves assist in the mulching of grass cut by said head monofilament lines during the cutting operation.

6. The head of claim 3 including a plurality of reinforcing sleeves each defining a longitudinal bore therethrough suitable for receiving a monofilament line, each of said reinforcing sleeves including a flared section at one end portion and having an outline suitable for being snuggly received in said opening defined in the outboard end portion of each of said line holders, the length of said sleeve being proportioned for extending a pre-selected distance outwardly from the outermost surface of said outboard end portion of said line holder upon mounting said sleeve in said line holder opening such that the flared end portion of said sleeve engages the innermost surface of said outboard end portion of said line holder.

7. The head of claim 1, 2 or 3 including an adaptor suitable for being received in the bore of said head body and defining an outside diameter which fits snuggly within said bore and further defining an inside diameter suitable for receiving the shaft of a conventional rotary mower, said adaptor serving to vary the effective diameter of said head body bore.

8. A head as defined in claim 1, 2 or 3 wherein said upper surface of said body defines a keyway having a pre-selected cross-sectional outline, said keyway serving to receive keys carried by certain conventional rotary mower hubs, said keys being received in said keyway to prevent rotation of said head with respect to said shaft.

9. The head of claim 8 wherein said upper surface of said body defines a milled-out section.

10. The head of claim 1, 2 or 3 wherein said head body is a pre-selected thickness and said openings in said line holders lie within a plane such that monofilament lines mounted within the openings in said line holders, reside proximate the cutting plane of a conventional mower.

* * * * *